United States Patent [19]

Zysk et al.

[11] 4,324,588

[45] Apr. 13, 1982

[54] ARC EROSION RESISTANT COMPOSITE MATERIALS AND PROCESSES FOR THEIR MANUFACTURE

[75] Inventors: Edward D. Zysk, Livingston; Robert Stephans, Westwood, both of N.J.

[73] Assignee: Engelhard Corporation, Iselin, N.J.

[21] Appl. No.: 67,268

[22] Filed: Aug. 17, 1979

[51] Int. Cl.³ .................... B22F 3/00; B22F 3/02; B22F 7/04
[52] U.S. Cl. ............... 75/208 R; 75/208 CS; 264/111; 313/141; 313/144
[58] Field of Search ............ 75/208 R, 208 CS; 428/558; 264/111; 313/141, 144

[56] References Cited

U.S. PATENT DOCUMENTS

| | | | |
|---|---|---|---|
| 2,365,083 | 12/1944 | Jarrett | 428/558 |
| 2,862,844 | 12/1958 | Luedeman | 428/558 |
| 3,496,622 | 2/1970 | Berghout et al. | 428/558 |
| 3,498,763 | 3/1970 | Savage | 75/208 R |
| 3,868,530 | 2/1975 | Eaton et al. | 313/141 |
| 4,048,705 | 9/1977 | Blanpain et al. | 428/558 |
| 4,093,887 | 6/1978 | Corbach et al. | 313/141 |

*Primary Examiner*—Brooks H. Hunt
*Attorney, Agent, or Firm*—Kenneth A. Genoni; John E. Crowe

[57] ABSTRACT

This invention relates to an arc erosion-resistant composite material and methods for its manufacture and, more specifically, composite arc erosion resistant materials useful as electrodes in spark plug and jet engine igniters to promote longer useful life. An arc resistant material in particulate form is dispersed throughout a lower melting matrix metal clad in a tube of nickel or nickel alloy, and then worked to a very small outside diameter, after which the composite may be cut to provide electrode elements. Ruthenium and iridium, and their alloys comprise the arc erosion resistant material. Suitable matrix metals comprise silver, gold, copper, nickel, and palladium.

5 Claims, No Drawings

ARC EROSION RESISTANT COMPOSITE MATERIALS AND PROCESSES FOR THEIR MANUFACTURE

The present invention relates to a novel composite material and, more particularly, to a novel arc erosion-resistant composite material made by novel methods of fabrication. More particularly, the invention relates to a novel and advantageous composite material for use as spark plug and jet igniter center electrodes.

BACKGROUND AND PRIOR ART

Automobile engine spark plug electrodes erode during use because of spark erosion as well as because of the corrosive effect of tetraethyl lead and other additives in the fuel or engine oil. The erosion increases the spark gap, requiring increasingly greater voltage, which, in turn, accelerates the rate of erosion.

Typically, the electrodes of automobile spark plugs are fabricated from nickel-chromium alloys comprising in the range of about 80–98% nickel and 2–15% chromium, optionally alloyed with small amounts (e.g., 2–5%) of manganese and/or iron. In order to reduce the rate of electrode erosion, it is known to fabricate the electrodes from noble metals, for instance, an alloy of 60% gold and 40% palladium, or an alloy of 96% platinum and 4% tungsten containing dispersed thorium oxide. However, these alternative alloys are expensive and the 60% gold-40% palladium alloy is adversely affected by lead-containing compounds, such as tetraethyl lead.

In avoiding or reducing pollutants discharged to the atmosphere in automobile engine exhaust gas, it is advantageous to improve the effectiveness and efficiency of the spark ignition of fuel. One means for accomplishing this is to employ spark plug center electrodes having a diameter of about 0.01–05 inches. This permits plug designs which cause less masking of the ignition arc and can result in a more efficient firing of the fuel. Although it is possible to fabricate nickel-chromium alloy center electrodes of such relatively small diameter, commercial practice has been to fabricate such electrodes with diameters of about 0.1–0.12 inches, in order to avoid the rapid rate of erosion which occurs with nickel-chromium alloy electrodes of smaller diameters.

Equally as important as minimizing spark erosion of the electrodes is avoiding fouling of the plug, which can result in misfiring, with resulting lower efficiency and increased emissions. To minimize fouling, good spark plug design calls for the nose of the plug to project into the cylinder. However, this causes the tip of the plug to run hotter and can result in faster erosion.

The center electrode of a jet engine igniter is usually made of tungsten or an alloy comprising predominantly tungsten, whereas the ground electrode is often a nickel alloy, such as Inconel. Because the severe operating conditions in a jet engine (about 1800° F. or higher) favor erosion, however, igniters are normally employed only during take-off, landing and during adverse atmospheric conditions conducive to flame-out. Improved erosion resistance would permit longer or continuous operation of a jet igniter, thus improving reliability and safety.

Ruthenium, iridium, platinum and alloys or mixtures thereof have been suggested in the prior art for use as spark plug and jet igniter center electrodes because of their arc erosion resistance and their high melting points and hardness. However, in all of the prior art constructions, the quantity of the precious metal employed per electrode is so high that the price of the spark plug becomes excessive and uneconomical. In addition, commercially pure ruthenium cannot, by currently known commercial technology, be satisfactorily reduced in size by hot or cold working, and the difficulty in fabricating crack-free articles made of ruthenium has deterred the use of it as a center or ground electrode.

A number of methods have been described to avoid such problems. In the manufacture of alloys for use as switch contacts, U.S. Pat. No. 3,278,280 describes a liquid phase sintering method by which a metal powder mixture of ruthenium, gold and palladium is heated to a sufficiently high temperature to liquify and distribute the gold-palladium phase. In another method, the patent describes a process of compacting ruthenium powder and then infiltrating the compact with a molten gold-palladium alloy. The workability of the resulting duplex alloy is said to be superior to that of pure ruthenium. U.S. Pat. No. 3,498,763 describes an improvement wherein the above-mentioned gold-palladium phase is replaced with a matrix of copper, or an alloy of copper with nickel and/or palladium, and states that the workability of the product also produced by a liquid phase sintering, is improved to the point that it "may readily be drawn to wire".

U.S. Pat. No. 3,868,530 describes the use of gold, platinum, palladium, rhodium, rhenium, ruthenium, and tungsten as spark plug center electrodes. A precious metal tip in the form of a fine wire (typically 0.010 to 0.030 inches in diameter) is inserted into a recess in a nickel rod or tube and the tube or rod is swagged to reduce its diameter somewhat to effectively lock the fine wire precious metal into place. The criterion given for the selection of the precious metal alloy is that it be such that it can be drawn into fine wire form and that it will resist sparking erosion.

The methods described in U.S. Pat. Nos. 3,278,280 and 3,498,763 are less than satisfactory. The liquid phase sintering method they describe is an expensive, difficult process and the resulting products are difficult to draw to the very fine diameters desired for a spark plug or jet igniter center electrode application. As a practical matter, metals such as ruthenium are not commercially available in fine wire form as referred to in U.S. Pat. No. 3,868,530, primarily because of the extreme difficulty in fabricating crack-free wrought wire from these metals by the methods taught in the patent. In addition, the handling and insertion of small diameter (0.005 to 0.02 inches diameter) short length inserts is a tedious and difficult operation.

Spark plug electrodes may also be made by the methods disclosed in U.S. Pat. Nos. 3,977,841 and 3,957,451, wherein ruthenium powder is mixed with a prealloyed powder of cobalt, nickel, chromium, tungsten, and silicon and then pressed and sintered in the liquid phase at temperatures of about 2150° F. to 2250° F. Silicon is known to form with ruthenium a eutectic melting at a low temperature. This should affect adversely the arc erosion properties of the composite.

Composite spark plug electrodes have heretofore been of the solid base metal core-type in which a center metal is covered by a plating or cladding of a more spark erosion resistant material. Typical of such electrodes are those disclosed in U.S. Pat. Nos. 2,783,409, 3,119,944, 3,356,882, and 3,857,145.

Composite wire for welding rods and the like has been produced by filling a metal tube with powder and drawing the composite to the appropriate size. Such methods are disclosed in U.S. Pat. Nos. 2,888,740, 3,391,444, 3,533,152, 3,824,097 and 3,922,769 and generally relate to the application of hard facings by means of such composite welding rods and the making of so-called "superalloys".

DESCRIPTION OF THE INVENTION

The invention comprises an arc erosion resistant composite material, and methods for its manufacture, in which a mixture of an arc erosion resistant material is dispersed throughout a matrix metal having a lower melting point, and the resulting core-composition is enclosed within a tubular cladding material of nickel or a nickel alloy. The arc erosion resistant material includes a core of ruthenium, iridium, ruthenium and iridium, or alloys or mixtures thereof dispersed in a lower melting matrix metal such as silver, gold, palladium, nickel, copper or alloys or mixtures thereof, and surrounded by cladding, inclusive of nickel or nickel alloy. The dispersed arc erosion resistant material particles may or may not be soluble in the matrix metal. The percent by weight of the dispersed arc resistant particles may be varied within the range of from about 5% to about 98%, and the lower melting matrix metal will accordingly be within the range of from about 95% to about 2%. (All core compositions are stated herein as percent by weight of the combined arc erosion resistant material and the matrix metal.)

For purposes of the present invention, the core is not necessarily limited in shape, and can be cylindrical, multisided or even a flat piece.

The arc erosion resistant material comprises particles of ruthenium or iridium, or alloys of the two, or alloys of either of them, in which ruthenium and/or iridium predominate, with minor amounts of other metals, or physical mixtures of particles of any of the foregoing. Such other metals include those which have high melting points, as, e.g., tungsten or rhenium, or, less desirably, platinum or rhodium. Iridium and ruthenium may be used alone or alloyed together in any proportion, from zero to 100%. From trace amounts up to not more than 10%, and preferably not more than 5%, of tungsten, rhenium, platinum or rhodium, or combinations thereof, may be alloyed with either ruthenium or iridium or alloys of them. It is to be understood that the term "alloy", as applied herein to ruthenium or iridium, embraces the inclusion of small amounts of other elements which may be present, intentionally or inadvertently.

The matrix metal is prodominantly one or a combination of the metals named above, and may optionally by employed as an alloy or as a physical mixture. The matrix metal or metals may also be alloyed with minor amounts of other metals not named above. Such metals serve as a binder for the arc resistant particles, as well as a lubricant for these particles during cold working. The use of silver or gold as a matrix enables the cold fabrication of economical composites containing very high percentages of iridium and/or ruthenium and their alloys. Silver is preferred, because of its excellent cold working properties, which facilitate the formation of a dense crack-free core. For purposes of this invention, a core comprising 10% matrix silver and the remainder ruthenium is found useful.

Both the matrix metal and the arc erosion resistant metal are employed in particulate form, such as small granules or pellets, and preferably as a powder passing through a 100 mesh screen (U.S. Sieve Series) and more desirably through a 325 mesh screen. It is advantageous, in order to minimize segregation of particles, but not essential, that both the matrix metal and the arc erosion resistant material have approximately the same particle size distribution. The use of small pellets or granules is generally feasible only when the initially-formed core (as described hereinafter) is of a diameter greater than about ¼ inch.

The cladding material is inclusive of nickel or a nickel alloy, such as those having in the range of 0.5-5% of tungsten, chromium, rhenium, or manganese. Multi-component alloys may also be employed, such as 79% nickel, 4% molybdenum and 17% iron, or 18% nickel, 3% molybdenum, less than 1% each of titanium and aluminum and the balance iron; or alloys referred to as Hastaloy-brand grades B, D, G, N or W. The cladding material may also be of the above nickel or nickel alloys and preferably contain small amounts of a refractory oxide, e.g., about 2% thoria, such as that sold by the Fansteel Corporation under the brand name TD-Nickel. Including a refractory oxide in the nickel or nickel alloy improves the high temperature strength and stiffness of the cladding material during hot working operations.

The cladding for the mixed core of arc erosion and matrix materials has multiple purposes: to minimize the amount of very expensive noble metals which are used as a center electrode of a spark plug or a jet igniter; to enable the fabrication of exceptionally fine diameter wire of metals, especially ruthenium, which are otherwise very difficult or impossible to so fabricate; and to improve the handleability of electrode segments of short length and fine diameter during the manufacture of spark plugs and igniters.

The outside diameter of the clad composite may be any size that is convenient for the end use, e.g., in the range of from about 0.02 to 0.15 inches. For example, for a center electrode in a jet engine igniter the outside diameter may be from about 0.100 inches to about 0.125 inches. For a center electrode in a spark plug the outside diameter may be 0.040 inches. The diameter of the center core with the arc resistant material may vary with the severity of its intended application or its projected life, and may be as low as 0.01 or 0.005 inches. Of course, the smaller the diameter of the center core, the less is the cost of its noble metal constituents per unit.

According to one method for producing an arc erosion resistant composite material, pellets, granules or powders of the arc erosion material and the matrix metal are compressed from green state pellets into a bar which is inserted into a close-fitting tube of nickel or nickel alloy. (As employed herein, the phrase "green state" means an article fabricated to desired size and shape by pressing together metal particles of the desired composition. After pressing, the metal particles are held together mechanically and not metallurgically. The bond is sufficient to insure the integrity of the pressed compact during handling.) The diameter of the bar is not critical, and may be in the range of approximately one-half to one inch or more. After sealing, the tube or assembly is reduced by cold working such as by swagging, drawing, rolling, or extrusion to form a composite wire having a predetermined outside diameter. Depending on the percent reduction taken, it may be desirable to anneal the composite as an intermediate step in the cold working process to relieve the sheath of working stresses. The resulting wire is then cut into segments, each segment forming an electrode which may be attached to a spark plug or jet igniter to serve as a center electrode. During initial use, the base metal cladding at the operating tip of the electrode is eroded away by arcing (sometimes referred to as the "banana effect"), further exposing the arc erosion resistant center core.

According to a second method of preparation, a nickel or nickel alloy tube is closed at one end and then filled with admixed powders having the desired composition of arc resistant materials and matrix metals. Ultrasonic vibration may be conveniently employed to increase the bulk density of the mixed powder but is not essential. After sealing the second end of the tube, the assembly is then cold worked [as described above].

The composite containing the arc resistant noble metal core can be attached to the tip of the center electrode of a spark plug or jet igniter by conventional means, e.g., by welding, or by brazing with a suitable material. The length of the desired composite can be adjusted to suit the means of joining which is to be employed.

In a preferred embodiment, pressed pellets (or an isostatically pressed bar) in the "green state" having a composition of 90 wt.% ruthenium and 10 wt.% silver and a diameter of 0.60 inches is inserted into a close-fitting nickel tube having a wall thickness of 0.045 inches. After sealing the ends of the tube with metal plugs, the assembley is cold worked to the finished outside diameter of, illustratively, 0.040 inches, with stress relief annealing at 550° C. for 10 to 12 minutes being employed after each 40-60% reduction in diameter.

A particularly advantageous combination of core materials, according to this invention, is achieved by selecting ruthenium or ruthenium alloys as the arc erosion material, and silver as the matrix metal. The Table below indicates the wide variety of percentages by weight which have been fabricated successfully into composite wire, and which would be useful as spark plug electrodes.

TABLE

| Composition of Core (Percentage by Wt.) | Outside Diameter (Inches) | Wall Thickness of Nickel Sheath (Inches) | Diameter of Core Material (Inches) |
|---|---|---|---|
| 70 Ru - 30 Ag | .040 | .004 | .032 |
| 90 Ru - 10 Ag | .040 | .004 | .032 |
| 80 Ru - 20 Ag | .040 | .004 | .032 |
| 20 Ru - 80 Ag | .040 | .010 | .020 |
| 76 Ru - 4 Pd - 20 Ag | .040 | .006 | .028 |

Having thus described the invention, what is claimed is:

1. A method for obtaining arc erosion-resistant composite material for use with electrodes, which method comprises:
    compressing a core of green state pellets of (a) an arc erosion resistant material selected from the group consisting of ruthenium, iridium, alloy of ruthenium, alloy or iridium, alloy of ruthenium and iridium, and mixtures thereof, and (b) a matrix metal selected from the group consisting of silver, copper, gold, palladium, nickel, alloys thereof, and mixtures thereof;
    inserting said core into a close-fitting tube of a material selected from the group consisting of nickel and nickel alloy;
    sealing said tube; and
    reducing the diameter of said tube by cold working to a predetermined outside diameter.

2. The method of claim 1 wherein said core comprises about 10% silver and 90% ruthenium, or ruthenium alloy.

3. The method of claim 1 in which sealing of said tube is accomplished by crimping.

4. The method of claim 1 in which the sealing of said tube is accomplished by inserting metal plugs.

5. The method of claim 1 wherein the diameter is reduced by alternating steps of cold working said tubularly enclosed core in the range of from about 40% to about 60% reduction in outside diameter, and annealing to relieve stress in the tubing caused by the working.

* * * * *